(12) United States Patent
Klingen et al.

(10) Patent No.: US 10,049,352 B2
(45) Date of Patent: Aug. 14, 2018

(54) METHOD AND SYSTEM FOR PROCESSING A MOBILE PAYMENT TRANSACTION

(71) Applicant: Apriva, LLC, Scottsdale, AZ (US)

(72) Inventors: Michael S. Klingen, Paradise Valley, AZ (US); Edward F. Staiano, Phoenix, AZ (US)

(73) Assignee: Apriva, LLC, Scottsdale, AZ (US)

( * ) Notice: Subject to any disclaimer, the term of this patent is extended or adjusted under 35 U.S.C. 154(b) by 609 days.

(21) Appl. No.: 14/625,152

(22) Filed: Feb. 18, 2015

(65) Prior Publication Data

US 2016/0239824 A1    Aug. 18, 2016

(51) Int. Cl.
*G06Q 40/00* (2012.01)
*G06Q 20/32* (2012.01)
*G06Q 20/38* (2012.01)

(52) U.S. Cl.
CPC ......... *G06Q 20/322* (2013.01); *G06Q 20/385* (2013.01); *G06Q 20/3821* (2013.01)

(58) Field of Classification Search
CPC combination set(s) only.
See application file for complete search history.

(56) References Cited

U.S. PATENT DOCUMENTS

| | | | |
|---|---|---|---|
| 8,645,222 B1* | 2/2014 | Tamassia | G06Q 30/0635 705/26.1 |
| 9,715,689 B1* | 7/2017 | Ellis | G06Q 20/367 |
| 2007/0055630 A1* | 3/2007 | Gauthier | G06Q 20/24 705/44 |
| 2013/0226799 A1* | 8/2013 | Raj | G07C 9/00 705/44 |
| 2014/0074714 A1* | 3/2014 | Melone | G06Q 20/322 705/44 |
| 2014/0136355 A1* | 5/2014 | Park | G06Q 20/385 705/21 |
| 2014/0156514 A1* | 6/2014 | Liu | G06O 20/16 705/39 |
| 2015/0278773 A1* | 10/2015 | Rolf | G06Q 20/02 705/39 |
| 2015/0339668 A1* | 11/2015 | Wilson | G06Q 20/401 705/41 |

* cited by examiner

*Primary Examiner* — William E Rankins
(74) *Attorney, Agent, or Firm* — Law Offices of David O. Caplan, PLLC.

(57) ABSTRACT

In a transaction between a merchant and a customer, a mobile payment token is provided which includes a mobile payment indicator that indicates payment is to be facilitated by interaction with a customer mobile device, and a mobile device identifier that uniquely identifies the customer mobile device. The mobile payment token is provided in a transaction message to a transaction processing component in place of, and consistent with a format of, a primary account number (PAN). The transaction processing component, upon determining the transaction message contains a mobile payment indicator, sends the mobile device identifier to a mobile payment server which uses the mobile device identifier to interact with the customer mobile device to facilitate the payment transaction. Based on a reply from the customer mobile device, the mobile payment server provides information to the transaction processing component to complete the transaction.

10 Claims, 4 Drawing Sheets

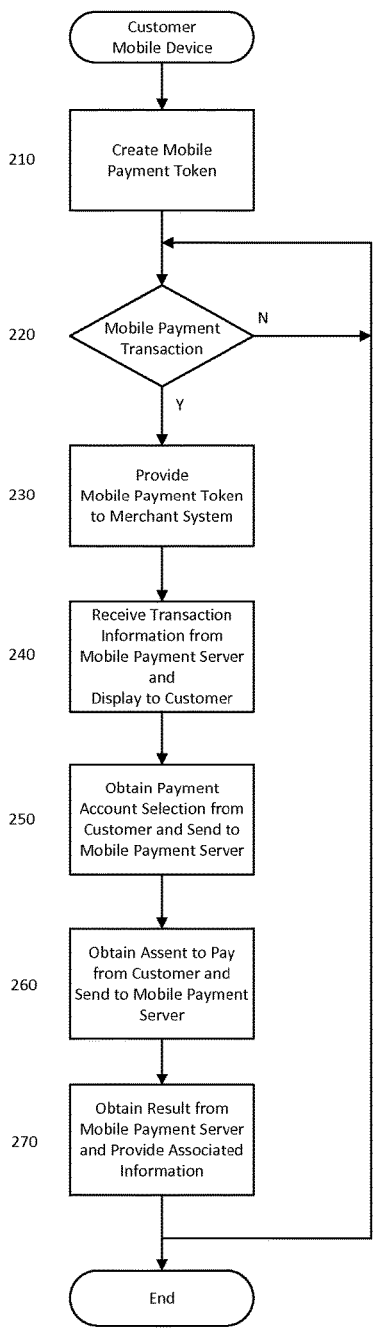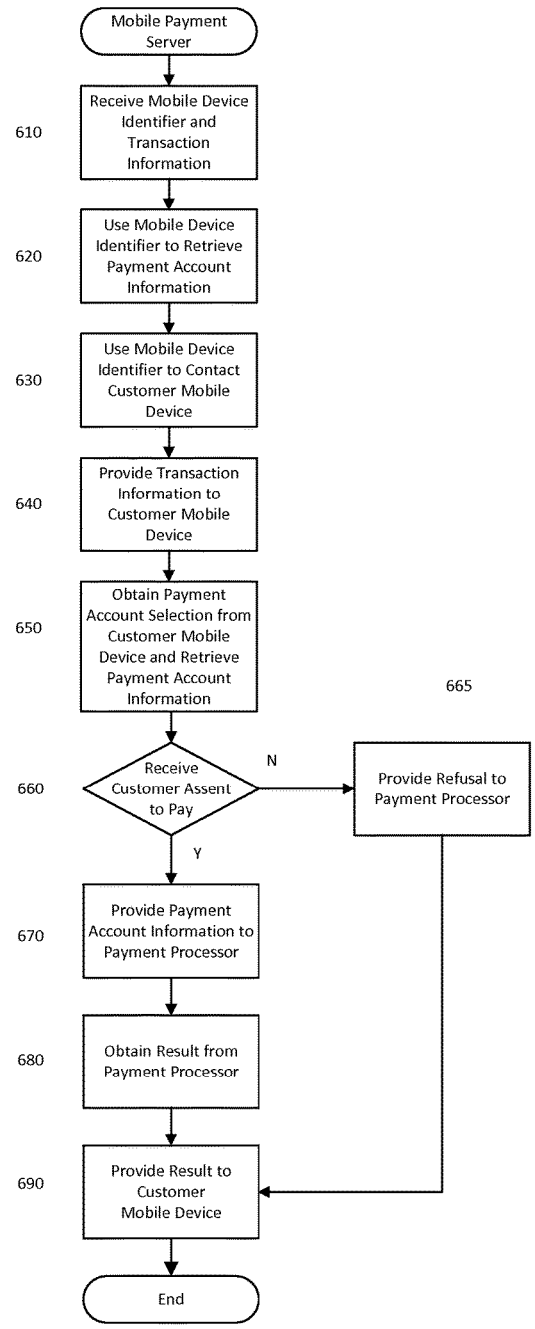

METHOD AND SYSTEM FOR PROCESSING A MOBILE PAYMENT TRANSACTION

FIELD OF THE INVENTION

The present invention relates generally to electronic payment transactions facilitated by mobile devices.

BACKGROUND

Mobile devices such as Smartphones are increasingly utilized to facilitate payments for purchases and other transactions. When a transaction is initiated, such as via a merchant system at a point of sale or a via a customer device in an online purchase, a debit or credit card number of the customer is then sent electronically in a transaction message to a payment gateway, payment processor, and/or or payment network to process payment for the transaction. This includes obtaining authorization to charge a payment account of the customer that corresponds to the card number. If the authorization is obtained, the transaction is allowed to proceed, and funds are at some point moved from the customer's account to the merchant's account.

Integrating customer mobile devices into this process allows for the addition of valuable functions such as providing notification of the transaction to the customer, obtaining confirmation from the customer to pay for the transaction, obtaining a selection from the customer of which account to make the payment with, and so forth. Conventional means of processing payments, however, do not optimally support the accomplishment of such functions in the short space of time during which a transaction typically occurs. The specific format required by transaction messages and the specific ways in which such transaction messages are utilized, for example, do not currently provide for efficient notification of relevant transaction processing components that the customer mobile device is to be involved in the transaction, or for efficient interaction with the customer mobile device in the process.

Another disadvantage of the current approach is that the security of the debit or credit card number may be compromised. Transaction messages include, among other things, a primary account number (PAN) that corresponds to the debit or credit card account of the party making payment. Although the PAN is necessary to process a payment, providing it to and from the point of sale exposes it to potential discovery by unintended parties each time a purchase is made. And if the merchant retains the PAN on a merchant system or database, it continues to be exposed to potential discovery by unintended parties in the event the merchant system is breached thereafter. Any such discovery could cause major problems for a cardholder, such as theft of funds or identity theft, and could require considerable time and effort trying to mitigate the damage done. It could also cause major problems for the merchant, including loss of funds on a potentially large scale, damage to reputation, loss of business, and the expenditure of time and money investigating and tracking the occurrences, responding to complaints, implementing new procedures and so forth.

For these reasons, there is a need for a means of more efficiently and securely handling payment transactions that are facilitated by customer mobile devices.

SUMMARY OF THE INVENTION

A method and system are provided for securely and efficiently performing a payment transaction between a merchant and a customer with a customer mobile device. A mobile payment token is first created in a format consistent with a format that is already utilized to represent primary account numbers of debit or credit cards while processing payments by accounts associated with such cards. The mobile payment token includes a mobile payment indicator that indicates the payment is to be facilitated by a customer mobile device. The mobile payment token further includes a mobile device identifier that uniquely identifies the customer mobile device such that it can be contacted in the course of facilitating the payment.

During a transaction, based on information obtained from the customer or customer mobile device, a merchant system of the merchant provides the mobile payment token in place of a primary account number in a transaction message. The merchant system sends the transaction message to a transaction processing component such as a payment network, payment processor or payment gateway, as it would in a conventional transaction. If the transaction processing component determines that a transaction message contains a mobile payment indicator, it sends the mobile device identifier to a mobile payment server which uses the mobile device identifier to interact with the customer mobile device to facilitate the payment transaction. Based on a reply from the customer mobile device, the mobile payment server provides payment account information to the transaction processing component, which applies it to obtain authorization to pay for the transaction from a customer payment account.

In various aspects of the invention which may be provided in any appropriate combination, the mobile payment server may interact with the customer mobile device to facilitate the transaction in various ways. In one such aspect, the mobile payment server may obtain the customer's assent to pay for the transaction and, upon doing so, provide a confirmation to the transaction processing component which allows processing to move forward. In another aspect, the mobile payment server may obtain a payment account selection from the customer mobile device, retrieve payment account information corresponding to the selection, and provide the payment account information to the transaction processing component to process the payment. Alternatively, the mobile payment server may first utilize the mobile device identifier to look up associated payment account information and provide it to the customer mobile device in order to obtain confirmation of a presumed payment account or to obtain selection of a different payment account. In any of these aspects, as appropriate, the mobile payment server may also obtain, from the transaction processing component, transaction information that was also included in the transaction message, such as a total cost of the transaction, and may provide the transaction information to the mobile customer device to further facilitate the transaction.

In various embodiments of the invention, the mobile payment server may be isolated from other components of the transaction processing system to provide additional security in processing a payment transaction. The mobile payment server may be isolated physically, such as by providing the connection between the mobile payment server and the transaction processing component over a dedicated line not accessible to other external networks such as the Internet, and/or providing a portion of the connection between the mobile payment server and the customer mobile device over a dedicated line not accessible to other external networks such as the Internet. The mobile payment server may also be isolated functionally, such as by excluding performance of functions other than the mobile payment server functions described herein, or those essential to supporting such functions.

In various embodiments of the invention, the mobile payment token may be created by the customer mobile device, by the mobile payment server, or otherwise, as appropriate to the circumstances at hand. In one implementation, the mobile device identifier may be a direct contact number such as a telephone number of the customer mobile device. In an alternative implementation, the mobile device identifier may be a value that is derived based on such a direct contact number, such as by the customer mobile device or the mobile payment server applying an algorithm that produces a value that is unique to the customer mobile device, in which case the mobile payment server may apply a companion algorithm to extract the direct contact number from the derived value upon later receiving it in processing the payment transaction.

In various embodiments of the invention, the mobile payment token may be provided to the merchant system during a transaction by the customer entering information into a keyboard, keypad, touchpad, etc., by providing a card such as a magnetic stripe card to an appropriate card reader, by spoken communication to the merchant who then enters the number, by tapping an NFC-enabled customer mobile device on a merchant NFC reader, by beacon communication between the mobile device and the merchant system, or by other available means. In various implementations, the merchant system may be a point of sale (POS) system such as at a merchant store location, a merchant mobile device such as a Smartphone equipped with a card reader and POS application, or a merchant online server working in combination with a customer device such as a desktop computer running a client application by which transactions such as online purchases can be made.

In various embodiments of the invention, the customer mobile device may send a notification to the mobile payment server at the commencement of the transaction to potentially speed the processing thereafter and/or add additional security by confirming the customer mobile device is the same as that identified in the mobile payment token sent by the merchant system. Alternatively or additionally, the customer mobile device may obtain a transaction identifier from the merchant system at the commencement of the transaction and send the transaction identifier to the mobile payment server to potentially speed the processing thereafter and/or add additional security by confirming the transaction identified by the transaction identifier is the same as indicated by transaction information sent by the merchant system.

In various embodiments of the invention, the mobile payment server may obtain from the transaction processing component a result of processing the payment and provide the result back to the merchant system which may thereafter provide, to the merchant and/or customer, associated information such as an indication of the result, a receipt, an offer or a coupon. Alternatively and/or additionally, the mobile payment server may provide the result or associated information to the customer mobile device, which may thereafter provide, to the customer, associated information such as an indication of the result, a receipt, a coupon or offer, an adjusted account balance, an adjusted loyalty balance, and so forth.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout.

FIG. 2 is a flowchart showing the main steps performed by a customer mobile device in accordance with an embodiment of the invention;

FIG. 6 is a flowchart showing the main steps performed by a mobile payment server provided in accordance with an embodiment of the invention;

It should be appreciated by one of ordinary skill in the art that, while the present invention is described with reference to the figures described above, the invention may include a variety of embodiments consistent with the description herein. It should also be understood that, where consistent with the description, there may be additional components not shown in the system diagrams or additional steps not shown in the flowcharts, and that such components and steps may be arranged or ordered in different ways.

DETAILED DESCRIPTION OF EXEMPLARY EMBODIMENTS

A method and system are described below with respect to a transaction processing system in which a payment transaction between a merchant and a customer is facilitated by a customer mobile device. As used herein and where appropriate in the context of the description, the term "merchant" may refer to a business, a particular store location or mobile unit of such a business, a specific employee or agent of such a business, and so forth. Similarly, as used herein and appropriate to the context of the description, the term "customer" may refer to an individual who possesses, interacts with and/or owns the customer device, an individual who communicates with the merchant and/or takes possession of the item or items, or an individual, group or entity who maintains a payment account from which funds are drawn to pay for the purchase. The terms "merchant" and "customer" may also apply to private parties engaged in private transactions such as a person-to-person transaction in which one individual is a merchant who provides an item or items to another individual who is the customer.

Also as used herein, a "transaction", "payment transaction", "payment" or "purchase" may refer to, as appropriate, any financial transaction in which one party provides payment to another party, including a sale, lease, charitable contribution, tip, reimbursement, loan, repayment, settlement, judgment and so forth. In similar fashion, an "item" or "items" may refer to anything for which payment is provided, such as one or more products, services, donations, gratuities, rights, interests and so forth. The appropriate interpretation(s) of the terms "transaction", "payment transaction", "payment", "purchase", "merchant", "customer", "item", "items" and other terms used herein will be comprehended by one of ordinary skill in the art in the context of their use in the description herein, and should be understood to potentially include all potential interpretations reasonably within the scope of the invention.

Figure 1:
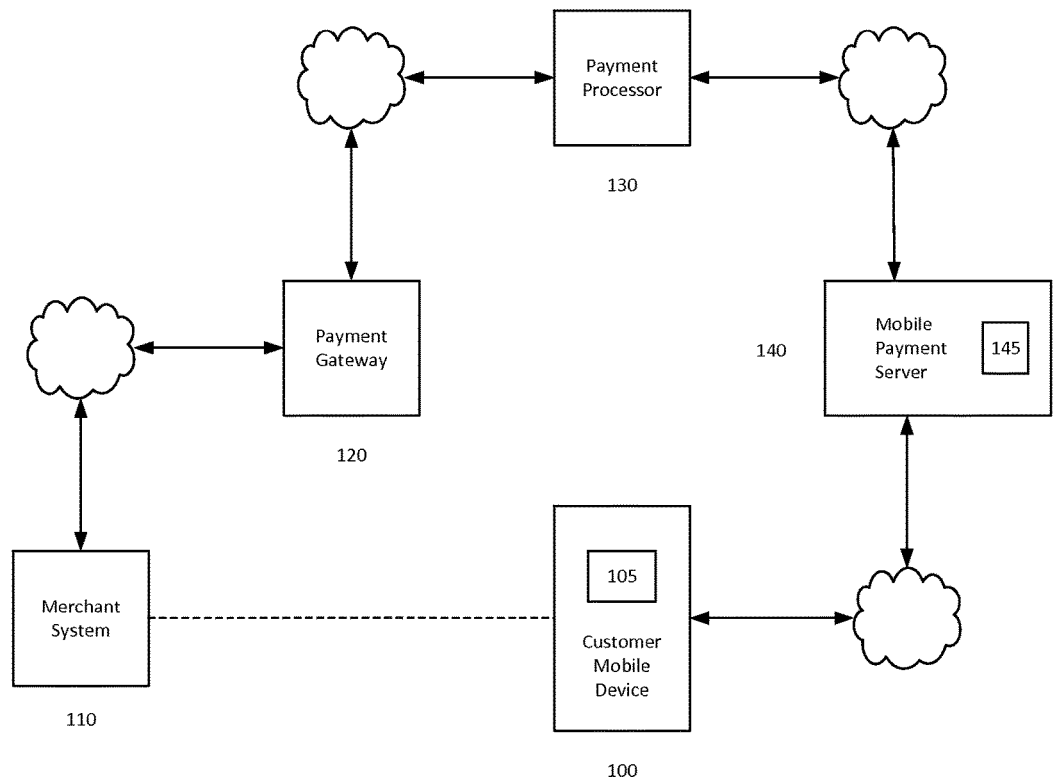
FIG. 1 is a system diagram of a transaction processing system in accordance with an embodiment of the invention in which the mobile payment server is invoked by a payment processor.

The present invention may be implemented within a transaction processing system by providing, among other things as will be explained, a mobile payment server and by configuring a transaction processing component of the system to invoke the mobile payment server when a transaction message is received that has a mobile payment token in place of a primary account number. In various embodiments of the invention, this transaction processing component may be a payment network, a payment processor or a payment gateway. FIG. 1 shows a transaction processing system in an embodiment in which the transaction processing component that invokes the mobile payment server is a payment processor. As defined herein, a "payment processor" is an entity or, as appropriate, an electronic and/or computer system performing the functions of such an entity, which handles payment transactions between a merchant and potentially multiple acquiring banks ("acquirers") utilized by the merchant to handle payment transactions corresponding to various card types (credit, debit . . . ) and card brands (Visa, MasterCard . . . ) and route transaction messages to an acquirer that corresponds to the type and brand of the card provided by the customer.

In accordance with the system shown in FIG. 1, a customer possesses a customer mobile device 100 which is, for example, a mobile communication device such as a Smartphone, a tablet computer or other mobile computing device capable of running a software application such as mobile payment application 105. The mobile payment application 105 is, for example, a conventional wallet application that allows the customer to initiate and complete payments using previously stored or newly entered payment account information, and may contain additional capabilities such as the provision and management of receipts, coupons, discount offers, loyalty credits, and so forth, where such wallet application is additionally configured as appropriate to perform functions that define and/or support the invention as described herein.

The merchant in the payment transaction maintains a merchant system 110 which is, for example, a conventional point of sale (POS) system such as a POS terminal, a POS server and related components and devices. A portion of the merchant system 110 may be operated by a merchant employee or, in alternative implementations, may be a self-checkout system, a vending machine, or an automated teller machine (ATM) in which case the merchant would be, for example, a bank that obtains funds from the customer's checking account and releases a corresponding amount of cash to be dispensed to the customer by the ATM. In yet another implementation, the merchant system 110 may be a merchant mobile communication device such as a Smartphone, tablet or other mobile communication device capable of running a POS software application that allows it to function essentially as a conventional POS terminal but in mobile environment.

The merchant system 110 includes some combination of components for obtaining customer and/or payment information as well as transaction information related to the current transaction. These components may include a magnetic stripe card reader, a near field communication (NFC) receiver, a beacon transceiver, universal product code (UPC) scanner, quick response (QR) code reader and/or a keyboard, keypad, touchpad or the like. In an alternative embodiment where the transaction is performed online rather than at a merchant location or device, the merchant system 110 may instead be implemented by some combination of appropriate components such as a merchant online server working with a customer device such as a desktop computer running a client application by which transactions such as online purchases may be made.

In order to effectuate processing of a payment transaction, the merchant system 110 provides a transaction message, potentially via a payment gateway 120, to a payment processor 130. A payment processor conventionally has the capability of receiving transaction messages that include a primary account number (PAN) and providing the PAN, via appropriate entities such as acquirer, payment network, etc., to a card issuing bank of the customer in order to obtain authorization to pay with a corresponding payment account maintained by the customer. In the case of a transaction that is not facilitated by a mobile device, the transaction message provided from the merchant system 110 to the payment processor 130 would contain a PAN and the payment processor 130 would perform the conventional functions as described above. In the case of a transaction to be facilitated by a mobile customer device, however, the transaction message will contain, in accordance with the present invention, a mobile payment token in a same position and format as a PAN would be in for a conventional transaction and, as a result, the payment processor 130 will invoke the mobile payment server 140.

The merchant system 110 provides the transaction message to the payment processor 130 via a network which may be implemented by one or more external networks and any local networks as needed, and which may utilize the Internet and/or other communication means as appropriate. In various implementations, the merchant system 110 may communicate directly to the payment processor 130 or may, as shown in FIG. 1, communicate to the payment processor 130 via a payment gateway 120 that performs functions such as routing to multiple payment processors and providing added security to the process. In alternative embodiments that will be later described, a payment gateway in such position could itself be the transaction processing component that invokes the mobile payment server 140. However, where provided in a system in which the payment processor is the transaction processing component that invokes the mobile payment server 140, as described presently, the payment gateway 120 may be a conventional payment gateway which forwards the transaction message to the payment processor 130 without changing the portion that contains, as appropriate, either a PAN or a mobile payment token. In such case and where the payment gateway 120 potentially routes transaction messages to a payment processor selected among multiple payment processors, the mobile payment token will be configured, as will be explained in more detail below, as necessary to ensure that the payment gateway 120 routes the transaction message to the desired processor 130.

The mobile payment token includes a mobile payment indicator that indicates the transaction is to be a mobile payment and further includes a mobile device identifier that uniquely identifies the customer mobile device. When a transaction message contains a mobile payment token, the payment processor 130 will recognize the mobile payment indicator that signifies a mobile payment transaction and will provide, as a result, at least a portion of the data in the transaction message to the mobile payment server 140. This will include the mobile device identifier and may also include transaction information associated with the transaction. As will be explained, in response to providing this information to the mobile payment server 140, the payment processor 130 will receive payment account information from the mobile payment server 140 which allows it to process the payment transaction. The payment processor 130 communicates with the mobile payment server 140 via a network which may be implemented by one or more external networks and any appropriate local networks as needed. In one possible embodiment of the invention, the payment processor 130 communicates with the mobile payment server 140 over a secure connection which includes a dedicated line that is not connected to or accessible by other external networks such as the Internet. As such, the payment account information received from the mobile payment server 140 is protected from unwanted discovery by other parties.

The mobile payment server 140 interacts with the customer mobile device 100, using the mobile device identifier to contact the customer mobile device, and obtains a response from the customer mobile device 100 such as an assent to pay for the transaction and/or selection of an account to pay with, to facilitate payment for the transaction. When appropriate, the mobile payment server 140 retrieves payment account information associated with the mobile device identifier and/or payment account selection, such as a debit or credit card number, and communicates it back to the payment processor 130. The mobile payment server 140 may comprise a secure module such as a hardware security module 145 for securely storing the payment account information. The payment account information may be associated with the mobile device identifier and/or the payment account selection by any appropriate data structure. The mobile payment server 140 communicates with the customer mobile device 100 over a network which may be implemented by one or more external networks including a cellular network of a mobile operator that provides service to the customer mobile device 100, and any appropriate local networks. In one possible embodiment of the invention, the mobile payment server 140 communicates with the customer mobile device 100 via a secure connection. The secure connection may include, for example, a dedicated line between the mobile payment server 140 and the cellular network that is not connected to or accessible by other external networks such as the Internet. The secure connection may further include a private connection over the cellular network to the customer mobile device 100. As such, any payment account information received from the mobile payment server 140 is protected from unwanted discovery by other parties.

It should be understood that, in accordance with various embodiments of the invention, the customer mobile device 100, merchant system 110, payment gateway 120, payment processor 130 and mobile payment server 140 may also be protected by any number of appropriate security measures which prevent access from outside parties including firewall protection and so forth, and which further control user access to and interaction with devices therein, including a password, personal identification number (PIN) or various biometric applications. It should be further understood that the connections and networks among and between these components may be protected by any number of appropriate security measures to prevent access to the data communicated over such connections and networks and/or to mitigate or nullify the impact of any such access such as encryption, virtual private networks and so forth.

As described above, additional security may be provided by using a dedicated line in implementing the connection between the mobile payment server 140 and relevant payment processors such as the payment processor 130, and/or by using a dedicated line in implementing the connection between the mobile payment server 140 and the mobile phone operator that provides service to the customer mobile device 100, otherwise preventing access to or from external networks such as the Internet. Additional security may also be provided by isolating the mobile payment server 140 so as to essentially perform only the mobile payment functions described herein and not other functions that may introduce additional access and means for compromise of payment account information such as a credit card number or debit card number of the customer. Also as noted above, stronger protection of sensitive data such as the customer's payment account information may be provided when such information is maintained in a hardware security module 145 within the mobile payment server 140. Thus, with the mobile payment token being utilized in place of a PAN on the merchant side of the payment processor 130, the disclosure of sensitive payment account data such as debit or credit card numbers is limited to within a strongly protected zone.

FIG. 2 shows the main steps performed by the customer mobile device 100 in one possible embodiment of the invention. In step 210, a mobile payment token is first created which corresponds to the customer mobile device 100. The mobile payment token may be created at some point in time before the described transaction occurs, after which it may be used in any number of mobile payment transactions. In various embodiments of the invention, the mobile payment token may be created by the customer mobile device 100, in which case it may be provided to and stored by the mobile payment server 140 at some point thereafter, or may be created by other means such as the mobile payment server 140, in which case it may be provided to and stored by the customer mobile device 100 at some point thereafter. As another alternative, the mobile payment token could be created by the merchant system 110, based on information provided by the customer and/or the customer mobile device 100.

Figure 3:
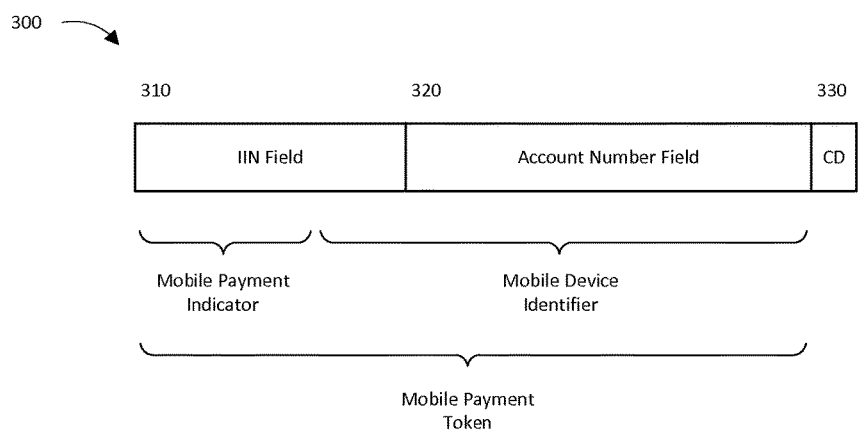
FIG. 3 is a block diagram showing components of a mobile payment token as may be provided in a transaction message in accordance with an embodiment of the invention.

As described above, the mobile payment token includes a mobile payment indicator that indicates the payment transaction is to be facilitated by a customer mobile device and further includes a mobile device identifier that uniquely corresponds to the customer mobile device to be used in facilitating the transaction. The mobile payment token is provided in a format consistent with a primary account number (PAN) such as a debit or credit card number. This allows the mobile payment token to replace the PAN in a transaction message that is normally used in processing a payment transaction. FIG. 3 shows one possible implementation of a mobile payment token provided in such a format. As shown in FIG. 3, the mobile payment token is arranged so as to be storable in a PAN field 300 of a transaction message that is provided, for example, in an ISO 8583 message format. The PAN field 300 itself conforms to an ISO/IEC 7812 numbering system format and, as such, includes an issuer identification number (IIN) field 310. an account number field 320 and a check digit field 330. In an embodiment of the invention, the mobile payment token is configured to work with conventional transaction processing components which route the transaction based on contents of the IIN filed 310. Accordingly, the mobile payment indicator will correspond to a unique bank identification number (BIN) range or to a BIN range of an existing card brand which is defined in conjunction with an issuing back to which the BIN range has been assigned.

In the implementation shown, the mobile payment token is provided such that the mobile payment indicator is stored in the first 4 digits of the IIN field 310 and the mobile device identifier is an 11 digit number stored in the last 2 digits of the IIN field 310 combined with all 9 digits of the account number field 320, with the check digit field 330 storing a check digit that is generated when the mobile payment token is initially created. The mobile payment indicator may be, for example, a 4 digit number that is either uniquely distinguishable from the first 4 digits of any IIN of any card issuer in existence, or corresponds to an IIN of a cooperating card issuer who reserves it for use only for mobile payment transactions of the nature described herein. In one possible implementation, the 11 digit mobile device identifier may be a 10 digit direct contact number such as a telephone number of the customer mobile device 100, appended or preceded by a single digit that represents, for example, a country to which the telephone number belongs. In an alternative implementation, the mobile device identifier may be a value that is derived based on such a number. As one example of this, the customer mobile device 100 or the mobile payment server 140 may apply an algorithm to the direct contact number to produce a value that is unique to the customer mobile device 100. In such case, the mobile payment server 140 would apply a companion algorithm to extract the direct contact number from the derived value upon later receiving it in the process of a payment transaction.

Although the mobile payment token is described above as a "number" such as would be consistent with a PAN format that is currently required in many systems, the inventive concept should be considered applicable to any future modifications or potential variations in which non-numeric characters may be used to represent a PAN or other value that performs a similar function. In such case, the mobile payment token might be represented by any set of characters that comply with a required format and can be represented digitally. As such, a mobile device identifier might be represented as a string of any such characters that may be used to contact a customer mobile device, or a derivation of such a string.

Returning to FIG. 2, as noted above, once the mobile payment token has been created it can be used in any number of mobile transactions. In step 220, the customer mobile device 100 determines whether such a mobile transaction is potentially imminent. This may be determined in a number of possible ways including customer input to the customer mobile device 100 via touch screen or voice input, recognition by the operating system and/or mobile payment application 105 that the customer mobile device 100 has been presented to an NFC reader, or recognition of a beacon communication between the customer mobile device 100 and merchant system 110 where each is accordingly equipped with a beacon transceiver. One example of a system in which a merchant POS system communicates with a mobile customer device via beacon is described in U.S. patent application Ser. No. 14/497,772, entitled "System and Method for Facilitating a Purchase Transaction using a Customer Device Beacon," which is herein incorporated by reference. Step 220 may be repeated on a continual basis during a period of time until there is an indication of a mobile payment transaction.

Upon determination in step 220 that a mobile payment transaction is potentially imminent, the customer mobile device 100 provides the mobile payment token in step 230 to the merchant system 110. The mobile payment token may be provided, for example, by presenting the customer mobile device 100 to an NFC reader of the merchant system 110, or by transmitting one or more beacon signals to a beacon transceiver of the merchant system 110. In alternative implementations, all or a portion of the mobile payment token or value from which it is derived may be provided to the merchant system 110 by means other than the customer mobile device 100. In circumstances in which the customer is present at the point of sale where the customer mobile device 100 is located, the customer may interact directly with the merchant via spoken communication or presentation of a payment card or a card having the mobile payment token, and/or the customer may interact directly with merchant system 110 such as via a card swipe, voice or keypad entry. In circumstances where the customer is not present at the point of sale, such as an online purchase by a remote customer via a remote device as described above, the functions by which the transaction is initiated and first provided for processing may be performed by some combination of the remote customer, the remote device, the merchant server, and so forth.

In alternative embodiments, rather than providing the entire mobile payment token in the format described above, information that corresponds to only a portion of the token may be provided to the merchant system 110, and/or the information may be provided in a different format than will be used in the transaction message. However, providing the mobile payment token to the merchant system 110 in a same format as a conventional debit or credit card number would be received does provide the advantage that the mobile payment token can be handled by the merchant and/or merchant system 110 in the same way it would handle a PAN, such that implementation of the invention is possible without requiring alterations to the numerous merchant POS systems that currently exist, or to the functions performed by the merchant employees who may work with them.

Figure 5:
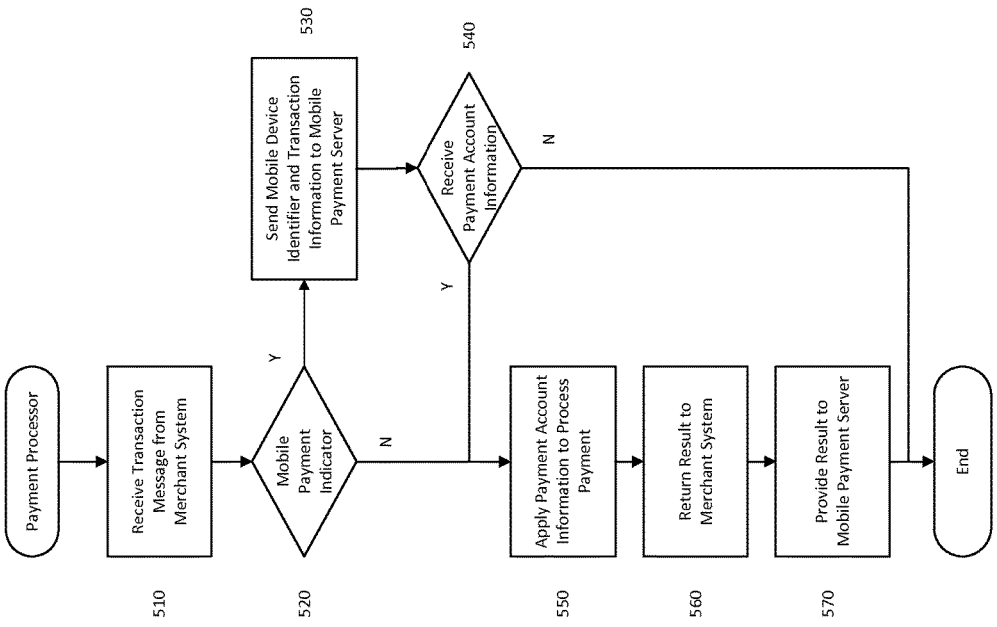
FIG. 5 is a flowchart showing the main steps performed by a payment processor in accordance with an embodiment of the invention.
Figure 4:
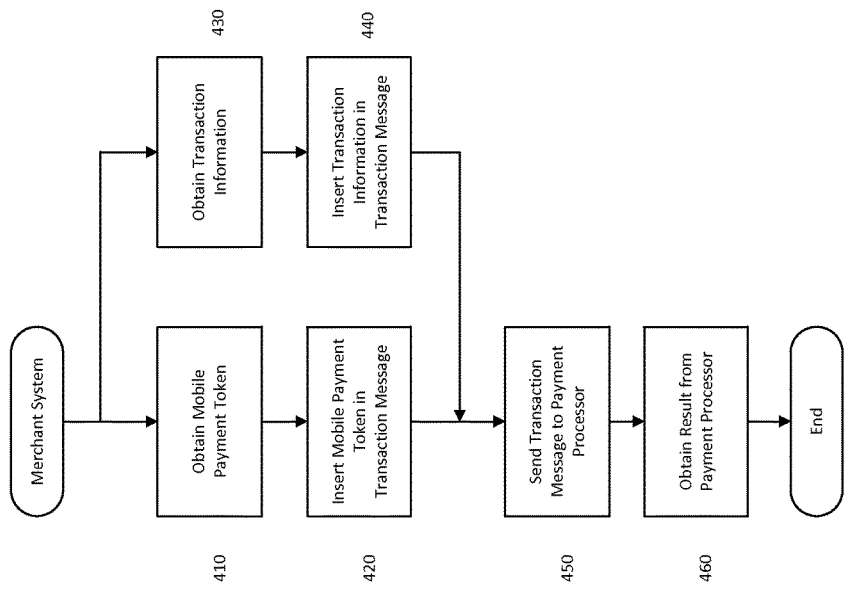
FIG. 4 is a flowchart showing the main steps performed by a merchant system in accordance with an embodiment of the invention.

The functions of the mobile customer device described in FIG. 2 and the format of the mobile payment token described in FIG. 3 are generally applicable regardless of whether the transaction processing component that invokes the mobile payment server is a payment network, payment processor or payment gateway. FIGS. 4-6, however, correspond to the case described above with reference to FIG. 1, where the transaction processing component that invokes the mobile payment server is a payment processor. Thus in FIG. 4 the functions of the merchant system 110 will be described in terms of its interaction with such a payment processor, FIG. 5 will describe the functions performed by such a payment processor, and FIG. 6 will describe the functions of the mobile payment server 140 in terms of its interaction with such a payment processor. As will be understood by one of ordinary skill in the art, where the transaction processing component that invokes the mobile payment server is a payment gateway as will be shown in FIG. 7, or is a payment network as will be shown in FIG. 8, the steps performed will follow a similar logic but differ as appropriate to the implementation at hand.

FIG. 4 shows the main steps performed by the merchant system 110 in an implementation in which the payment processor 130 is the transaction processing component that invokes the mobile payment server 140. In step 410, the merchant system 110 obtains the mobile payment token by whatever means and in whatever form are consistent with the means and form in which it was provided by the customer mobile device in step 230, as explained above. In step 420, the merchant system 110 inserts the mobile payment token into a transaction message which includes, for example, a PAN field 300 that stores the mobile payment token in the form described above with reference to FIG. 3. In alternative embodiments where the merchant system 110 receives information that corresponds to only a portion of the token and/or the information is provided in a different format than will be used in a transaction message, the merchant system 110 may arrange the information as appropriate before providing the mobile payment token. For example, the customer or customer mobile device 100 might only provide the customer's phone number, in which case the merchant system 110 might itself supply the mobile payment indicator and insert it into the transaction message, in addition to inserting the phone number, or a value derived therefrom, as the mobile device identifier. As another alternative, the customer mobile device 100 might only provide the mobile payment indicator while the customer provides the phone number to the merchant or merchant system, in which case the merchant system 110 would arrange and combine the mobile payment indicator and mobile device identifier as appropriate to insert the mobile payment token into the transaction message.

In step 430, at some time before, during or after steps 410 and 420 but prior to step 440, the merchant system 110 obtains transaction information related to the transaction in progress. This may be done in a conventional manner and includes, for example, item information, price information, total cost, merchant identifier, terminal identifier, etc. The transaction information may be obtained, for example, through some combination of a UPC scanner, touchpad, keyboard interface, QR code reader, and existing information maintained by the merchant system 110. In step 440, at some time before, during or after steps 410 and 420 but prior to step 450, the merchant system 110 inserts the transaction information into the transaction message in a conventional manner. When steps 420 and 440 have both been completed, the merchant system 110 sends the transaction message in step 450 to the payment processor 130.

FIG. 5 shows the main steps performed by the payment processor 130 in an implementation in which the payment processor 130 is the transaction processing component that invokes the mobile payment server 140. In step 510, the payment processor 130 receives the transaction message from the merchant system 110. As explained above, the transaction message may be received directly from the merchant system 110 or may be received from a payment gateway 120 that receives the transaction message from the merchant system 110, depending on the configuration of the transaction processing system. In step 520, the payment processor 130 determines whether the transaction message contains a mobile payment indicator. Where the mobile payment token is provided as shown in FIG. 3, for example, the payment processor 130 makes this determination by reading the IIN field 310 and comparing it with a value that has been predefined to indicate the transaction is a mobile transaction.

If the payment processor 130 determines in step 520 that the transaction message contains a mobile payment indicator, the payment processor 130 provides, in step 530, the mobile device identifier and at least a portion of the transaction information from the transaction message to the mobile payment server 140. Where the mobile payment token is provided as shown in FIG. 3, for example, the payment processor 130 reads the mobile device identifier from the account number field 320 and reads the transaction information, for example, with reference to a location in the transaction message in which such information is conventionally stored. Depending on the functions to be performed by the mobile payment server 140, the transaction information provided by the payment processor 130 may include total cost, specific item and price information, a merchant identifier, and so forth.

FIG. 6 shows the main steps performed by the mobile payment server 140 in an implementation in which the payment processor 130 is the transaction processing component that invokes the mobile payment server 140. In the embodiment primarily described herein, the mobile payment server is first notified of the mobile payment transaction upon receiving the transaction message from the payment processor 130. In an alternative embodiment, prior to some or all of the steps shown in FIG. 6, the customer mobile device 100 may have already notified the mobile payment server 140 of an impending mobile payment transaction, such as by sending an appropriate message at some point after step 220 and before step 240 of FIG. 2. For example, the customer mobile device 100 may have provided the mobile payment token, its mobile device identifier, phone number or any message the mobile payment server 140 can use to uniquely identify the customer mobile device 100. This notification may be utilized to speed the transaction by retrieving information ahead of time, and/or to increase security by ensuring the information from the customer mobile device 100 identifies the same device as that from the payment processor 130. It may also serve to effectively secure the customer's assent to pay for the transaction, rendering it unnecessary to obtain such assent thereafter as is described below. Additionally or alternatively, the customer mobile device 100 may have provided a payment account selection at the time of such notification, rendering it unnecessary to obtain such selection thereafter as described below.

In another alternative embodiment, prior to some or all of the steps shown in FIG. 6, the customer mobile device 100 may have obtained a transaction identifier such as a merchant identification number (MID) from the merchant system 110 such as via a beacon signal or other means, and may have thereafter provided the transaction identifier to the mobile payment server 140 to be utilized to identify the transaction, such as by matching it to a MID contained in the associated transaction message. Such a means of matching the customer with the transaction is described in detail in the above-referenced and incorporated U.S. patent application Ser. No. 14/497,772. This information may be utilized to speed the transaction by retrieving information ahead of time, and/or to increase security by ensuring the information from the customer mobile device 100 identifies the same transaction as that from the payment processor 130. It may also serve to effectively secure the customer's assent to pay for the transaction, rendering it unnecessary to obtain such assent thereafter as is described below.

Proceeding with FIG. 6, the mobile payment server 140 receives in step 610 the mobile device identifier and transaction information from the payment processor 130. In one possible implementation, the mobile payment server 140 first provides payment account information to the customer mobile device 100 so that it may initially inform the customer of the presumed payment account, balance and so forth. In such case the mobile payment server 140 would, in step 620, utilize the mobile device identifier to retrieve the payment account information or a portion thereof. The mobile payment server 140 may retrieve the payment account information by, for example, looking up the mobile device identifier or a value derived therefrom in an appropriate data structure in which it has been previously stored in association with the payment account information.

The payment account information of the customer may have previously been obtained by the mobile payment server 140 in a variety of ways. For example, a credit card or debit card account number may have been provided by the customer at an earlier point in time via the mobile payment application 105 of the customer mobile device 100, which thereafter provided it to the mobile payment server 140. As noted above, in an embodiment of the invention, a portion of the network over which the customer mobile device 100 communicates with the mobile payment server 140, such as over a dedicated line not connected to or accessible by external networks such as the Internet so as to be protected from unwanted discovery by other parties, to then be stored in a secure module such as the hardware security module 145, and only accessed thereafter as needed to process a payment transaction as described herein. Payment account information may have been obtained for each of multiple payment accounts of the customer in a similar fashion. Where multiple payment accounts exist, the initially provided payment account information may correspond to a payment account that has been previously designated as a default or determined based on any appropriate combination of rules based on preferences, balances and so forth.

In step 630, the mobile payment server 140 employs the mobile device identifier to contact the customer mobile device 100. In an embodiment where the mobile device identifier includes a direct contact number such as a telephone number of the customer mobile device 100, for example, the mobile payment server 140 contacts the customer mobile device 100 using the direct contact number. In alternative embodiments where the mobile device identifier is a value that is derived based on such a direct contact number, the mobile payment server 140 extracts the direct contact number from the mobile device identifier and uses the extracted direct contact number to contact the customer mobile device 100. For example, where the mobile device identifier has been previously generated by applying an algorithm to the contact number to generate a unique value to be used as the mobile device identifier, the mobile payment server 140 applies a companion algorithm which extracts the contact number from the mobile device identifier. In an embodiment where the mobile device identifier includes a digit indicating the country, the mobile payment server 140 may use that digit to determine whether the contact is to require an international call and, if so, to look up a corresponding country code.

In step 640, the mobile payment server 140 provides the transaction information to the customer mobile device 100. In various embodiments, the transaction information provided will depend on what transaction information the customer mobile device 100 will thereafter provide to the customer in facilitation of the transaction. For example, the transaction information provided may include total cost, specific item and price information, a merchant identifier, and so forth. The transaction information may also be supplemented with additional information that is associated with the customer, such as identification of a payment account with which the customer is currently associated by the mobile payment server 140, such as where the customer is associated with only one payment account or where a default account has previously been set, selected or otherwise determined by the customer, the customer mobile device 100 or the mobile payment server 140. Such additional information may have been retrieved, for example, based on the mobile device identifier as described in step 620.

Returning to FIG. 2, the customer mobile device 100 receives in step 240 the transaction information from the mobile payment server 140, along with any additional information as described above, and provides it to the customer via the mobile payment application 105. The mobile payment application 105 might display, for example, a message that says "Charge $40.55 to your VISA ending in 1234?" or "Please confirm your purchase of a Caprina scarf from Murdoch & Tuttle for $40.55." In various implementations, the customer mobile device 100 may provide the transaction information to the customer by displaying it on a display screen or by other means, such as automated voice communication. In alternative implementations, the customer mobile device 100 may use means other than or in addition to the mobile payment application 105 to provide the transaction information, such as text messaging software resident on the customer mobile device 100.

In step 250, the customer mobile device 100 obtains a payment account selection from the customer and provides it to the mobile payment server 140. In alternative embodiments, the transaction may be associated with a single payment account only, or may be associated with a payment account the customer has already selected earlier in the transaction as described above, or may be associated with a payment account that the user has previously selected as a default prior to the transaction, or the customer mobile device 100 or mobile payment server 140 may apply various rules to determine which of multiple payment accounts to use, or how much of each, based on various data such as credit limits, relative balances and so forth. In yet another embodiment, the payment account selection may have been previously obtained from the customer mobile device 100 before providing the transaction information.

The customer mobile device 100 obtains the payment account selection from the customer by, for example, displaying via the mobile payment application 105 a menu of different payment options such as various credit cards, debit cards and so forth, from which the customer selects a payment option, and then sending the payment account selection, or information indicative of the selection, back to the mobile payment server 140. In alternative embodiments, the customer mobile device 100 may use means other than the mobile payment application 105 to obtain the payment account selection, such as text messaging software resident on the customer mobile device 100, automatic voice communication and so on. Where the payment account selection is already associated with the full payment account information by an appropriate data structure in the mobile payment server 140, it is rendered unnecessary for the customer mobile device 100 to provide such full payment account information at the time of selection, thereby providing additional protection of the payment account information from discovery. The customer mobile device 100 may be further configured to apply security measures to the selection, such as by performing a fingerprint scan when the user makes a selection through the touchscreen or by using voice recognition of a vocal selection or command to identify the customer.

In step 260, the customer mobile device 100 obtains from the customer an assent (or refusal) to pay for the transaction and provides it to the mobile payment server 140. That is, the customer mobile device 100 obtains an indication of agreement or permission from the customer to charge the payment to a bank account of the customer. Alternatively, the customer's assent may be presumed based on information as determined by the mobile payment server 140 and/or customer mobile device 100. For example, the customer's assent may be presumed for transactions that do not exceed a certain amount, presumed upon the customer having provided a payment account selection, presumed based on an earlier notification provided by the customer via the customer mobile device 100 as described above, presumed based on a matching of the mobile device identifier or direct contact number derived therefrom obtained from the merchant system 110 via the payment processor 130 with a number provided by the customer mobile device 100 to the mobile payment server 140, presumed based on a matching of a transaction identifier obtained from the merchant system 110 via the payment processor 130 with a transaction identifier provided by the merchant system 110 via the customer mobile device 100, or presumed for other reasons.

Where the customer mobile device 100 obtains an assent (or refusal) from the customer, it does so by, for example, providing via the mobile payment application 105 a "Yes" or "No" button after displaying transaction information as described above, or simply provides an "OK to Pay" button, and then sends information indicative of the customer's assent (or refusal) back to the mobile payment server 140. In alternative embodiments, the customer mobile device 100 may use means other than the mobile payment application 105 to obtain the customer's assent to pay, such as text messaging software resident on the customer mobile device 100, automated voice communication and so on. The customer mobile device 100 may be further configured to apply security measures to the selection, such as by performing a fingerprint scan when the user makes a selection through the touchscreen or by using voice recognition of a vocal selection or command to identify the customer.

Returning to FIG. 6, in step 650, the mobile payment server 140 obtains, where provided, the payment account selection from the customer mobile device 100 and uses the payment account selection to retrieve the payment account information. The payment account selection may be represented as any appropriate value either previously assigned to the account by the mobile payment server 140 and communicated to the customer mobile device 100 or previously assigned by the customer mobile device 100 and communicated to the mobile payment server 140. The mobile payment server 140 retrieves the payment account information by, for example, looking up the payment account selection in an appropriate data structure in which it has been previously associated with the payment account information. As was explained above with respect to step 620, the payment account information may be stored, for example, in the hardware security module 145 of the mobile payment server 140.

In step 660, the mobile payment server 140 determines, in an embodiment where the customer's assent to pay is sought as described above, whether such an assent has been obtained from the customer mobile device 100. If not, such as where a refusal to pay is obtained instead, or where no response is received after a predefined amount of time, the mobile payment server 140 provides a refusal back to the payment processor 130 in step 665. If the assent of pay is obtained in step 660 or presumed as described above, the mobile payment server 140 provides to the payment processor 130, in step 670, the payment account information corresponding to the payment account selection from the customer or otherwise determined as described above. The payment account information is, for example, a credit card or debit card account number corresponding to the selected or default payment account.

Returning to FIG. 5, if the payment processor 130 receives payment account information from the mobile payment server 140 in step 540, it applies the payment account information in step 550 to process the transaction. Upon receiving, for example, a credit card or debit card number from the mobile payment server 140, the payment processor 130 processes the transaction in a same or similar fashion as it would conventionally process a transaction upon receiving the credit card or debit card number in a PAN field 300 of a transaction message from the merchant system 110. This will typically include providing the PAN to a card issuing bank of the customer, such as via an acquirer corresponding to the card type and brand, a payment network utilized by the card issuing bank, and so forth, to obtain authorization to pay for the transaction with the payment account of the customer.

In step 560, the payment processor 130 returns the result of processing the payment (approved, declined . . . ) to the merchant system 110. Returning briefly to FIG. 4, the merchant system 110 obtains in step 460 the result from, in the case of the embodiment described with reference to FIG. 1, the payment processor 130, and provides associated information such as an indication of the result, a receipt, a coupon or offer, and so forth, which it stores, displays and/or prints for the merchant and/or customer, and so forth. Returning again to FIG. 5, the payment processor 130 also returns a result of processing the payment (approved, declined . . . ) to the mobile payment server 140 in step 570. Returning briefly to FIG. 6, the mobile payment server 140 obtains the result from the payment processor 130 in step 680 and provides the result to the customer mobile device 100 in step 690. Returning to FIG. 2, the customer mobile device 100 provides in step 270, based on the result, associated information such as an indication of the result, a receipt, an adjusted account balance, a coupon or offer, an adjusted loyalty balance, and so forth, which it stores and/or displays to the customer. Alternatively or additionally, the mobile payment server 140 may maintain some or all of the associated information and provide it to the customer mobile device 100.

Figure 7:
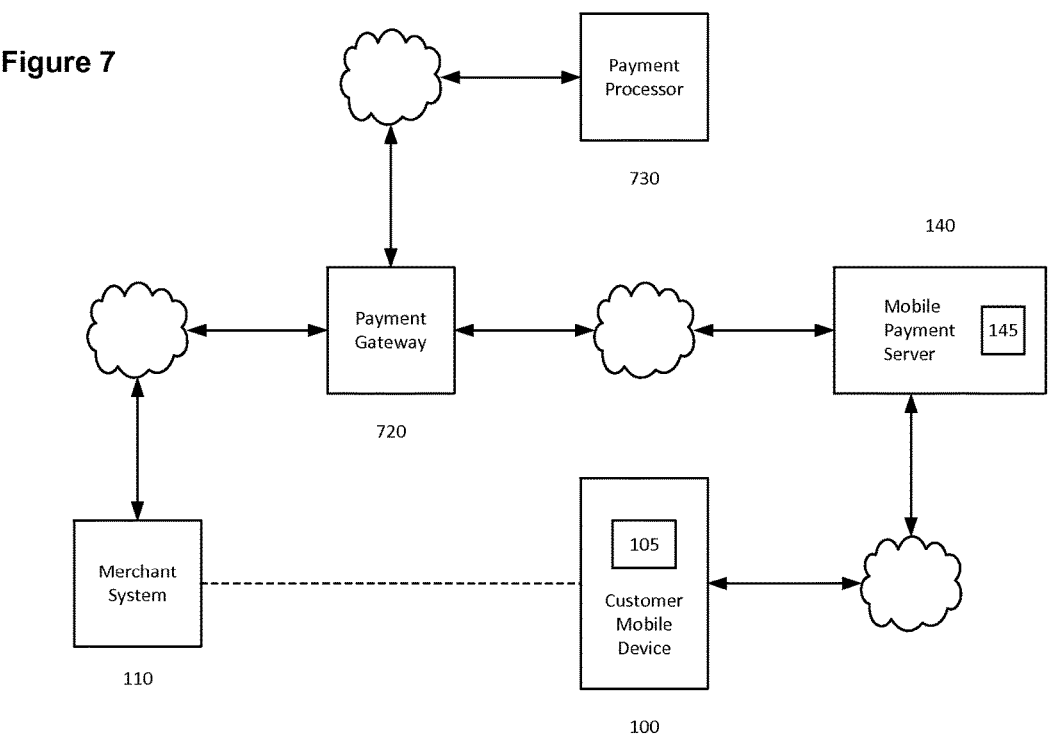
FIG. 7 is a system diagram of a transaction processing system in accordance with an embodiment of the invention in which the mobile payment server is invoked by a payment gateway.

As explained above, the present invention may be implemented within a transaction processing system by providing, among other things, a mobile payment server and by configuring a transaction processing component of the system to invoke the mobile payment server when a mobile payment token is provided to the transaction processing component in place of a primary account number. The invention has been specifically described above with reference to an embodiment in which the transaction processing component that invokes the mobile payment server is a payment processor. FIG. 7 shows a transaction processing system in accordance with an alternative embodiment in which the transaction processing component that invokes the mobile payment server is a payment gateway.

As shown in FIG. 7, the merchant system 110 provides the transaction message to a payment gateway 720 which determines whether the transaction is a mobile payment transaction and, if so, invokes the mobile payment server 140 to facilitate the payment transaction. The payment gateway 720 determines whether the transaction message contains a mobile payment indicator and, if so, provides the mobile device identifier and transaction information to the mobile payment server 140. Thereafter, the mobile payment server 140 contacts the customer mobile device 100 using the mobile device identifier, provides the transaction information to the customer mobile device 100 and obtains customer information back from the customer mobile device 100 in a fashion similar to that described above. The mobile payment server 140 then provides the payment account information to the payment gateway 720, which effectuates processing of the payment transaction by providing a transaction message with the payment account information to a payment processor 730 which, in this embodiment, processes it in a conventional fashion. Other components of the transaction processing system are numbered the same as in FIG. 1, as they function similarly to the way they are described above. It will be understood that such components may have some differences, however, as appropriate to function within the corresponding embodiment.

Figure 8:
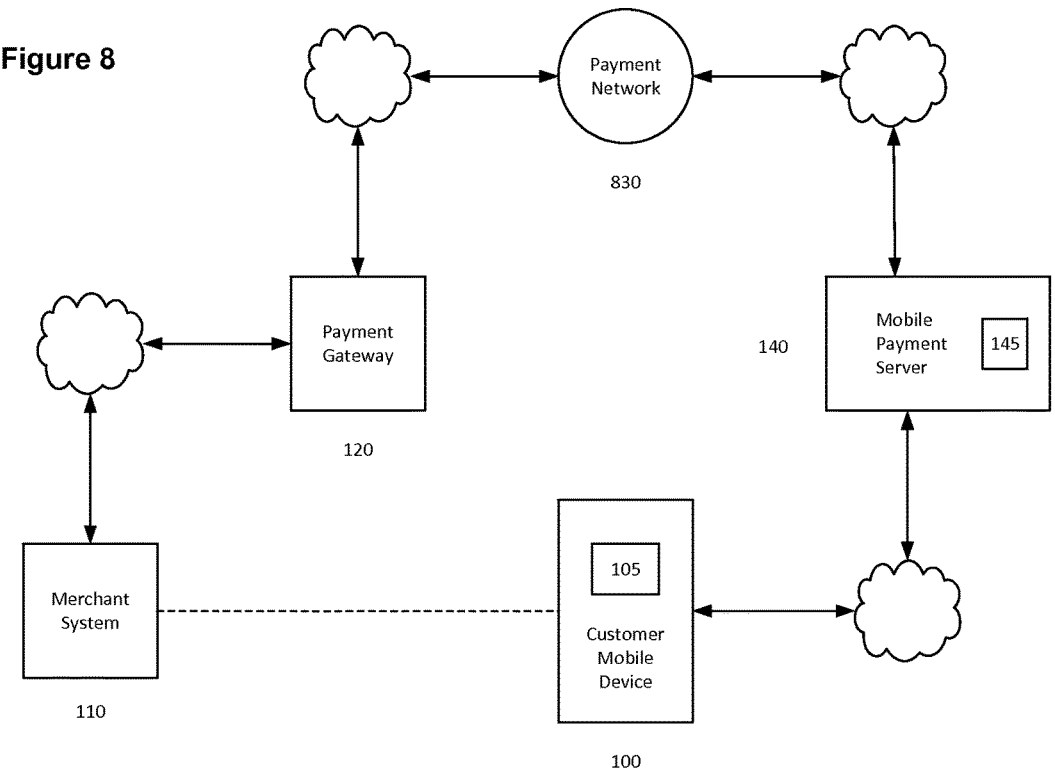
FIG. 8 is a system diagram of a transaction processing system in accordance with an embodiment of the invention in which the mobile payment server is invoked by a payment network.

FIG. 8 shows a transaction processing system in accordance with an alternative embodiment in which the transaction processing component that invokes the mobile payment server is a payment network. An example of such a payment network is VisaNet, provided by Visa Inc. Although a payment network may be utilized in conjunction with payment processor as described above, a payment network may also include functions described above as being performed by a payment processor, such as receiving transaction messages from merchant systems and interacting with acquirers to process the corresponding transactions. Accordingly, as shown in FIG. 8, the merchant system 110 provides the transaction message, via a payment gateway 120, to a payment network 830 which determines whether the transaction is a mobile payment transaction and, if so, invokes the mobile payment server 140 to facilitate the payment transaction. The payment network 830 determines whether the transaction message contains a mobile payment indicator and, if so, provides the mobile device identifier and transaction information to the mobile payment server 140. Thereafter, the mobile payment server 140 contacts the customer mobile device 100 using the mobile device identifier, provides the transaction information to the customer mobile device 100 and obtains customer information back from the customer mobile device 100 in a fashion similar to that described above. The mobile payment server 140 then provides the payment account information to the payment network 830, which provides it over the network to an acquirer, a card issuing bank of the customer, and so forth to obtain authorization to pay with a corresponding payment account of the customer. Other components of the transaction processing system are numbered the same as in FIG. 1, as they function similarly to the way they are described above. It will be understood that such components may have differences, as appropriate, to function within the configuration described with reference to FIG. 8.

In additional aspects of the invention, the mobile device identifier may be utilized by the payment gateway 120, mobile payment server 140 or other component of the system to determine whether the customer is entitled to any discounts as may be associated with membership in a loyalty program maintained by or otherwise associated with the merchant, and/or the customer's purchase history, behavioral history and so forth. In such case, the payment gateway 120, mobile payment server 140 or other component may apply the discount to adjust the purchase amount before providing information to effectuate the processing of the payment, and may communicate to the customer mobile device 100, merchant system 110 or other component that the discount was applied.

It should be understood that all communications among the customer mobile device 100, merchant system 110, payment gateway 120, payment processor 130, mobile payment server 140 and so forth may be encrypted and otherwise protected by any number of available security means as may be appropriate to the implementation at hand. Further, various information communicated among the customer mobile device 100, merchant system 110, payment gateway 120, payment processor 130 and mobile payment server 140 may be, as appropriate, formatted or arranged differently at different points in the transaction process, but will include or be derived from the data previously referenced by these terms.

In the foregoing specification, it should be appreciated that the particular implementations shown and described herein are illustrative of the invention and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections might be present in a practical system.

The present invention may be described herein in terms of functional block components, optional selections and/or various processing steps. It should be appreciated that, unless otherwise stated or more specifically described herein, such functional blocks may be realized by any number of hardware and/or software components suitably configured to perform the specified functions. Furthermore, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

Any system components discussed herein which involve the storage, access, reference, comparison, match or retrieval of data or similar functions, unless otherwise stated or more specifically defined, may be implemented with any appropriate system, including any type of database, such as relational, hierarchical, graphical, object-oriented, and/or other database configurations. Similarly, processing steps involving the performance of such functions may likewise be performed with any such appropriate system.

Unless otherwise stated or more specifically defined, the present invention may employ any number of conventional techniques for data transmission, messaging, data processing, network control, and/or the like. One skilled in the art will appreciate that, unless otherwise stated or more specifically described herein, a network may include any system for exchanging data or transacting business, such as the Internet, an intranet, an extranet, WAN, LAN, satellite communications, cellular network, and/or the like.

It should also be appreciated that any number of available security measures may be applied as appropriate to protect information at all stages of the purchase transaction including, but not limited to encryption, password or PIN number protection, speaker recognition and any biometric applications appropriate to secure and facilitate the functions described herein such as facial recognition, fingerprint detection, retinal scanning and so on.

The invention has been described with reference to specific embodiments. However, it may be appreciated that various modifications and changes may be made without departing from the scope of the present invention. The specification and figures are to be regarded in an illustrative manner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method of processing a payment transaction between a merchant having a merchant system and a customer having a customer mobile device, the method comprising the steps of:
    obtaining, from the merchant system, a transaction message that includes a primary account number field;
    determining whether the primary account number field contains a mobile payment indicator;
    routing the transaction message to a selected one of a plurality of transaction processing components of a transaction processing system, based on the mobile payment indicator contained in the transaction message;
    based on determining that the primary account number field contains the mobile payment indicator, providing to a mobile payment server a mobile device identifier also contained in the primary account number field, the mobile device identifier to be used by the mobile payment server to contact the customer mobile device;
    obtaining, from the mobile payment server, payment account information retrieved by the mobile payment server based on a confirmation provided by the customer mobile device to the mobile payment server; and
    processing the transaction based on the payment account information obtained from the mobile payment server.

2. The method of claim 1 wherein the step of processing the transaction comprises processing the transaction only when an assent to pay has been obtained by the mobile payment server from the customer mobile device.

3. The method of claim 1 wherein the step of obtaining payment account information from the mobile payment server comprises obtaining payment account information retrieved by the mobile payment server based on a payment account selection obtained by the mobile payment server from the customer mobile device.

4. The method of claim 1 wherein the step of obtaining the transaction message further comprises obtaining a transaction message that includes transaction information associated with the transaction, and further comprising the step of providing, upon determination that the primary account number field includes the mobile payment indicator, the transaction information to the mobile payment server to provide to the customer mobile device to facilitate the payment.

5. The method of claim 4 wherein the step of obtaining the transaction message that includes the transaction information further comprises obtaining a transaction message that includes a cost of the transaction, and wherein the step of providing the transaction information further comprises providing the cost of the transaction to provide to the customer mobile device.

6. The method of claim 4 wherein the step of processing the transaction comprises processing the transaction only when an assent to pay has been obtained by the mobile payment server from the customer mobile device.

7. The method of claim 4 wherein the step of obtaining payment account information from the mobile payment server comprises obtaining payment account information retrieved by the mobile payment server based on a payment account selection obtained by the mobile payment server from the customer mobile device.

8. The method of claim 1 wherein the step of providing the mobile device identifier comprises providing a telephone number of the customer mobile device to be used by the mobile payment server to contact the customer mobile device.

9. The method of claim 1, wherein the step of providing the mobile device identifier comprises extracting a telephone number of the customer mobile device from a value that has been uniquely derived from the telephone number and providing the extracted telephone number to be used by the mobile payment server to contact the customer mobile device.

10. The method of claim 1, further comprising the step of returning a result of processing the payment to at least one of the merchant system and the customer mobile device.

* * * * *